United States Patent
Maloney et al.

(10) Patent No.: US 7,440,762 B2
(45) Date of Patent: Oct. 21, 2008

(54) TDOA/GPS HYBRID WIRELESS LOCATION SYSTEM

(75) Inventors: John E. Maloney, Springfield, VA (US); Robert J. Anderson, Phoenixville, PA (US)

(73) Assignee: TruePosition, Inc., Berwyn, PA (US)

( * ) Notice: Subject to any disclaimer, the term of this patent is extended or adjusted under 35 U.S.C. 154(b) by 1 day.

(21) Appl. No.: 10/748,367

(22) Filed: Dec. 30, 2003

(65) Prior Publication Data

US 2005/0148346 A1    Jul. 7, 2005

(51) Int. Cl.
    *H04Q 7/20*    (2006.01)
(52) U.S. Cl. .............. 455/456.1; 455/404.2; 455/456.3; 455/457
(58) Field of Classification Search .............. 455/404.1, 455/404.2, 456.1, 456.2, 456.3, 457
    See application file for complete search history.

(56) References Cited

U.S. PATENT DOCUMENTS

| | | | |
|---|---|---|---|
| 4,445,118 A | 4/1984 | Taylor et al. | 342/357.09 |
| 4,483,460 A | 11/1984 | Whelan | 221/303 |
| 4,728,959 A | 3/1988 | Maloney et al. | 342/457 |
| 5,045,860 A | 9/1991 | Hodson | 342/451 |
| 5,317,323 A | 5/1994 | Kennedy et al. | 342/457 |
| 5,327,144 A | 7/1994 | Stilp et al. | 342/387 |
| 5,608,410 A | 3/1997 | Stilp et al. | 342/387 |
| 5,959,580 A | 9/1999 | Maloney et al. | 342/457 |
| 6,047,192 A | 4/2000 | Maloney et al. | 455/456 |
| 6,091,362 A | 7/2000 | Stilp et al. | 342/465 |
| 6,097,336 A | 8/2000 | Stilp | 342/357.02 |
| 6,101,178 A | 8/2000 | Beal | 370/336 |
| 6,108,555 A | 8/2000 | Maloney et al. | 455/456 |
| 6,115,599 A | 9/2000 | Stilp | 455/404 |
| 6,119,013 A | 9/2000 | Maloney et al. | 455/456 |
| 6,127,975 A | 10/2000 | Maloney | 342/457 |
| 6,172,644 B1 | 1/2001 | Stilp | 342/457 |
| 6,184,829 B1 | 2/2001 | Stilp | 342/387 |
| 6,266,013 B1 | 7/2001 | Stilp et al. | 342/387 |
| 6,266,533 B1 * | 7/2001 | Zadeh et al. | 455/456.2 |
| 6,281,834 B1 | 8/2001 | Stilp | 342/174 |
| 6,285,321 B1 | 9/2001 | Stilp et al. | 342/465 |
| 6,288,675 B1 | 9/2001 | Maloney | 342/457 |
| 6,288,676 B1 | 9/2001 | Maloney | 342/457 |
| 6,295,455 B1 * | 9/2001 | Fischer et al. | 455/456.2 |
| 6,317,081 B1 | 11/2001 | Stilp | 342/387 |
| 6,317,604 B1 | 11/2001 | Kovach, Jr. et al. | 455/456 |
| 6,334,059 B1 | 12/2001 | Stilp et al. | 455/456 |
| 6,351,235 B1 | 2/2002 | Stilp | 342/357.06 |

(Continued)

OTHER PUBLICATIONS

Agarwal, N. et al., "Algoithms for GPS operation indoors and downtown," *GPS Solutions*, 2002, 6, 149 -160.

(Continued)

*Primary Examiner*—Duc Nguyen
*Assistant Examiner*—Dai A Phuong
(74) *Attorney, Agent, or Firm*—Woodcock Washburn LLP

(57) ABSTRACT

A method and system for enhancing the accuracy and robustness of locations determined for a mobile wireless transceiver in a cellular telephone communications system integrates location-related information both from an assisted GPS device embedded in the mobile unit and from infrastructure-based facilities that extract signal characteristic data at networked base stations. Available supporting collateral information may be additionally evaluated in the location determinations to provide location estimates of enhanced robustness and accuracy.

7 Claims, 3 Drawing Sheets

U.S. PATENT DOCUMENTS

| | | | |
|---|---|---|---|
| 6,366,241 B2 | 4/2002 | Pack et al. | 342/442 |
| 6,388,618 B1 | 5/2002 | Stilp et al. | 342/457 |
| 6,400,320 B1 | 6/2002 | Stilp et al. | 342/457 |
| 6,442,392 B2 | 8/2002 | Ruutu et al. | 455/456.1 |
| 6,463,290 B1 | 10/2002 | Stilp et al. | 455/456 |
| 6,483,460 B2 | 11/2002 | Stilp et al. | 342/357 |
| 6,492,944 B1 | 12/2002 | Stilp | 342/387 |
| 6,519,465 B2 | 2/2003 | Stilp et al. | 455/456 |
| 6,538,600 B1 | 3/2003 | Richton et al. | 342/357.1 |
| 6,546,256 B1 | 4/2003 | Maloney et al. | 455/456 |
| 6,563,460 B2 | 5/2003 | Stilp et al. | 342/457 |
| 6,603,428 B2 | 8/2003 | Stilp | 342/457 |
| 6,646,604 B2 | 11/2003 | Anderson | 342/465 |
| 6,661,379 B2 | 12/2003 | Stilp et al. | 342/457 |
| 7,200,380 B2 | 4/2007 | Havlark et al. | 455/404.2 |
| 2002/0039904 A1 | 4/2002 | Anderson | 455/456.1 |
| 2002/0115448 A1* | 8/2002 | Amerga et al. | 455/456 |
| 2003/0017832 A1 | 1/2003 | Anderson et al. | 455/456.1 |
| 2003/0129996 A1* | 7/2003 | Maloney et al. | 455/456 |
| 2004/0008138 A1* | 1/2004 | Hockley et al. | 342/357.09 |
| 2004/0203853 A1* | 10/2004 | Sheynblat | 455/456.1 |
| 2005/0003833 A1* | 1/2005 | Younis | 455/456.1 |
| 2005/0012611 A1* | 1/2005 | Osman | 340/539.13 |
| 2005/0037775 A1* | 2/2005 | Moeglein et al. | 455/456.1 |
| 2006/0267841 A1* | 11/2006 | Lee et al. | 342/463 |

OTHER PUBLICATIONS

Bethel, R.E. et al., "A PDF Multitarget Tracker," *IEEE Trans. on AES*, 1994, 30(2), 386-403.

Biacs, Z. et al., "The Qualcomm/SnapTrack Wireless-Assisted GPS Hybrid Positioning System and Results from Initial Commercial Deployments," *CDMA Americas Congress 2003 Workshop II: Enhancing 3G Services Offerings with Precision Location-Based Services*, Miami, Florida, Dec. 8, 2003, 7 pages.

Bugayevskiy, L.M. et al., *Map Projections, A Reference Manual*, Taylor & Francis, 1995, Chapters 1 and 5, 1-47 and 155-169.

Srinivasiah, B. et al., "SnapTrack/GTEW/Sprint PCS: GPS-Assisted Location Technology, Alpha Trial Field Test in Tampa, Florida," Mar. 9-Apr. 2, 1999, *Version 8(F)*, 1-37.

Grewal, M.S. et al., *Global Positioning Systems, Inertial Navigation and Integration*, John Wiley, 2001, Chapters 1, 3, 4, 9, 1-8, 30-102 and 265-290.

Hata, M., "Empirical Formula for Propagation Loss in Land Mobile Radio Services," *IEEE Trans. Veh. Tech.*, 1980, VT-29(3), 317-325.

Hofmann-Wellenhof, B. et al., *Global Positioning System, Theory and Practice*, 5th Edition, Springer-Verlag, 1994, 4, 8 and 10, 39-70, 181-202 and 279-307.

Snyder, J.P., "Map Projections—A Working Manual," *US Geological Survey Professional Paper 1395*, US Government Printing Office, 1987, Chapters 8 and 15, 48-65 and 104-110.

Sorenson, H.W., "Least-Squares Estimation: From Gauss to Kalman," *IEEE Spectrum*, 1970, 7, 63-68.

Van Trees, H.L., *Detection, Estimation, and Modulation Theory, Part I*, John Wiley & Sons, Inc., 2001, Chapter 2 (Sections 2.1-2.4), 19-86.

* cited by examiner

TDOA/GPS HYBRID WIRELESS LOCATION SYSTEM

FIELD OF THE INVENTION

The present invention relates generally to wireless location systems, and more particularly to a wireless location system that employs both infrastructure-based and handset-based approaches for locating wireless devices. Some of the exemplary aspects of the present invention are particularly suited to a wireless location system and related methods and subsystems compatible with the Global System for Mobile Communication, or GSM. It should be noted, however, that although aspects of the systems and methods described herein relate specifically to a GSM system, the claims at the end of this specification are not to be construed as limited to a GSM system, except as they may be explicitly so limited.

BACKGROUND OF THE INVENTION

The present invention relates to the determination of the location of a mobile radio-frequency transceiver operating within the operational domain of a wireless communications network. In particular, the mobile units of primary interest are cellular telephones, personal digital assistants, wireless-equipped laptop computers, and other similar devices equipped with wireless transceivers for normal operation under a "cellularized" telephone system, such as one based on the Global System for Mobile communications (GSM). The location-determination technology described herein optimally integrates GPS data together with infrastructure data and collateral data, for enhanced accuracy and robust effectiveness under conditions that could degrade results individually achievable under the distinct approaches.

As realized and noted in extensive prior art, the ability to routinely, reliably, and rapidly locate cellular wireless communications devices has the potential to provide significant public benefit in public safety and convenience and in commercial productivity. Many systems have been described for the determination of the locations of such communications devices through the implementation of an infrastructure of location-determination facilities in affiliation with the communications system infrastructure. Examples of such infrastructure-based (or network-based) systems for the determination of locations for wireless mobile units are found in Stilp, et al., U.S. Pat. No. 5,327,144; Stilp, et al., U.S. Pat. No. 5,608,410; Kennedy, et al., U.S. Pat. No. 5,317,323; Maloney, et al., U.S. Pat. No. 4,728,959; and related art. The use of collateral information to enhance and even enable location determination in further applications of such infrastructure-based systems was introduced in Maloney, et al., U.S. Pat. No. 5,959,580; and further extended in Maloney, et al., U.S. Pat. Nos. 6,108,555 and 6,119,013. These and related following descriptions of the prior art for infrastructure-based location determination systems enable robust and effective location-determination performance when adequate measurement data can be derived or are otherwise available.

A dominant benefit in the use of infrastructure-based location systems is the applicability of the technology for the localization of any and all types of mobile wireless communications units. The infrastructure technology establishes the facility to locate the mobile units through the measurement of location-related signal characteristics inherent in the normal communications-band transmissions. Thus legacy phone models as well as newly emerging wireless communications units can all be equally served with the location facilities. The mobile units need only employ the standard wireless communications system signal formats and protocols, and do not require any special, localization-specific modification to support the location capability.

A difficulty that accrues in the application of the infrastructure-based systems occurs with their use in sparsely populated, rural environments. In these environments, the economic constraints of the underemployed communications facilities only support the deployment of the communications facilities at cellular land stations that are significantly distant from each other. With the similarly sparse deployment of location-determination facilities among the available cell sites, the accuracy of the calculated locations is degraded relative to that achievable in urban and suburban environments. In the urban and suburban environments, the spatial densities of the communications cell stations are high in order to service the demand for the communications traffic without routinely exceeding the capacities of the individual cells. With the similar deployment of location-system facilities at cell stations in comparatively close proximity to each other, the location determinations are derived with significantly higher quantities of contributing measurements, extracted at sensing locations with significantly higher signal strengths, providing significantly better cumulative precision for the location evaluations. The sparse deployment densities of the infrastructure equipment in rural environments challenge the accuracy capabilities for the infrastructure-based location determination systems.

Location-determination systems based upon the use of the U.S. government's Global Positioning System (GPS) are very accurate when the GPS receiver has reception access to an open sky. The constellation of GPS satellites transmitting from over head provides the signals from which the GPS receiver can determine its location. In rural domains where the view of the sky is open, exemplary GPS accuracy is routinely achievable.

Significant prior art is available for the use of GPS receivers embedded with mobile wireless communications transceivers to locate the mobile units. Example descriptions of such approaches are included in, e.g., U.S. Pat. No. 4,445,118, Apr. 24, 1984, "Navigation System and Method"; and U.S. Pat. No. 6,538,600 B1, Mar. 25, 2003, "Wireless Assisted GPS Using a Reference Location." The accuracy of the GPS devices is superb when an adequate number of relatively undistorted satellite signals is able to be received at sufficient signal strength.

Several difficulties are inherent in the use of GPS augmentations for determining locations for wireless communications units. The GPS facilities in the mobile units are distinct from the communications facilities, and hence only phone models that incorporate the additional hardware functionality for the GPS reception can be used to obtain the GPS-based location-determination benefits. The signal processing and analysis involved for the GPS signals includes added facilities to receive the GPS frequency band signals with their particular signal formats. The wireless unit must support the energy or power demands of this added functionality. In order to minimize the power drain in the mobile unit, the GPS reception may not be continuously active, e.g., when not needed for location support. However, acquisition and reception of the GPS signals requires a search for the applicable satellite signals at the time the location service is needed, and this search can result in a comparatively large time to first fix (TTFF) when the GPS receiver has not been actively monitoring the satellite signals for some time. Finally, the GPS receiver should be able to acquire and measure the characteristics of an adequate number of satellite signals across a relatively broad and uniform expanse of the sky in order to support the calculation of a location of acceptable accuracy. When the propagation paths from the satellites to the receiver are occluded or significantly distorted (e.g., by multipath propagation), a GPS-based solution is not available for the location determinations. Such signal occlusions and distortions persist when the GPS receiver is under foliage, behind terrain features, in the interiors of buildings, and/or at the base of downtown "urban canyons" with tall buildings obscuring the view of the sky.

Techniques that "assist" a GPS receiver to mitigate some of the above difficulties are described in the above-cited U.S. Pat. Nos. 4,445,118 and 6,538,600 B1. In supporting an assisted GPS (AGPS) receiver, the external AGPS infrastructure may be able to provide the guiding information that facilitates the reception of the necessary GPS signals when the strength of the signals is moderately degraded. Furthermore the assistance can result in the implementation of the GPS receiver with simpler, lower power circuitry. Perhaps most significantly, the assistance provided to the AGPS receiver guides the receiver in the parameters appropriate for acquiring those and only those satellites that are currently "over head." Thus the assistance reduces the signal search processing required to detect the satellite signals and thereby supports enhanced performance with a reduced response TTFF.

Despite these enhancements that the AGPS approach provides, the difficulties presented for adequate GPS signal acquisition in "heavy" urban environments still significantly degrade or effectively prevent a GPS-based location to an unfortunate extent. The volume of wireless communications traffic in these environments makes these difficulties an unacceptable burden in supporting public safety or emergency responses and in providing the productivity enhancements that location-based services can facilitate.

Further background information concerning wireless location can be found in the following United States Patents, which are owned by TruePosition, Inc., the assignee of the present invention: U.S. Pat. No. 6,661,379 B2, Dec. 9, 2003, Antenna Selection Method for a Wireless Location System; U.S. Pat. No. 6,646,604, Nov. 11, 2003, Automatic Synchronous Tuning Of Narrowband Receivers Of A Wireless Location System For Voice/Traffic Channel Tracking; U.S. Pat. No. 6,603,428, Aug. 5, 2003, Multiple Pass Location Processing; U.S. Pat. No. 6,563,460, May 13, 2003, Collision Recovery In A Wireless Location System; U.S. Pat. No. 6,519,465, Feb. 11, 2003, Modified Transmission Method For Improving Accuracy For E-911 Calls; U.S. Pat. No. 6,492,944, Dec. 10, 2002, Internal Calibration Method For Receiver System Of A Wireless Location System; U.S. Pat. No. 6,483,460, Nov. 19, 2002, Baseline Selection Method For Use In A Wireless Location System; U.S. Pat. No. 6,463,290, Oct. 8, 2002, Mobile-Assisted Network Based Techniques For Improving Accuracy Of Wireless Location System; U.S. Pat. No. 6,400, 320, Jun. 4, 2002, Antenna Selection Method For A Wireless Location System; U.S. Pat. No. 6,388,618, May 14, 2002, Signal Collection System For A Wireless Location System; U.S. Pat. No. 6,351,235, Feb. 26, 2002, Method And System For Synchronizing Receiver Systems Of A Wireless Location System; U.S. Pat. No. 6,317,081, Nov. 13, 2001, Internal Calibration Method For Receiver System Of A Wireless Location System; U.S. Pat. No. 6,285,321, Sep. 4, 2001, Station Based Processing Method For A Wireless Location System; U.S. Pat. No. 6,334,059, Dec. 25, 2001, Modified Transmission Method For Improving Accuracy For E-911 Calls; U.S. Pat. No. 6,317,604, Nov. 13, 2001, Centralized Database System For A Wireless Location System; U.S. Pat. No. 6,281,834, Aug. 28, 2001, Calibration For Wireless Location System; U.S. Pat. No. 6,266,013, Jul. 24, 2001, Architecture For A Signal Collection System Of A Wireless Location System; U.S. Pat. No. 6,184,829, Feb. 6, 2001, Calibration For Wireless Location System; U.S. Pat. No. 6,172,644, Jan. 9, 2001, Emergency Location Method For A Wireless Location System; U.S. Pat. No. 6,115,599, Sep. 5, 2000, Directed Retry Method For Use In A Wireless Location System; U.S. Pat. No. 6,097,336, Aug. 1, 2000, Method For Improving The Accuracy Of A Wireless Location System; U.S. Pat. No. 6,091,362, Jul. 18, 2000, Bandwidth Synthesis For Wireless Location System; U.S. Pat. No. 5,608,410, Mar. 4, 1997, System For Locating A Source Of Bursty Transmissions; and U.S. Pat. No. 5,327,144, Jul. 5, 1994, Cellular Telephone Location System. Other exemplary patents include: U.S. Pat. No. 6,546,256 B1, Apr. 8, 2003, Robust, Efficient, Location-Related Measurement; U.S. Pat. No. 6,366,241, Apr. 2, 2002, Enhanced Determination Of Position-Dependent Signal Characteristics; U.S. Pat. No. 6,288, 676, Sep. 11, 2001, Apparatus And Method For Single Station Communications Localization; U.S. Pat. No. 6,288,675, Sep. 11, 2001, Single Station Communications Localization System; U.S. Pat. No. 6,047,192, Apr. 4, 2000, Robust, Efficient, Localization System; U.S. Pat. No. 6,108,555, Aug. 22, 2000, Enhanced Time Difference Localization System; U.S. Pat. No. 6,101,178, Aug. 8, 2000, Pseudolite-Augmented GPS For Locating Wireless Telephones; U.S. Pat. No. 6,119,013, Sep. 12, 2000, Enhanced Time-Difference Localization System; U.S. Pat. No. 6,127,975, Oct. 3, 2000, Single Station Communications Localization System; U.S. Pat. No. 5,959, 580, Sep. 28, 1999, Communications Localization System; and U.S. Pat. No. 4,728,959, Mar. 1, 1988, Direction Finding Localization System.

In sum, over the past ten years organizations within the wireless telecommunications industry have invested significant time and resources in studying wireless location technologies. Of the technologies investigated to date, all have proven to have certain strengths and weaknesses. As of yet no single location technology has been identified that provides optimal performance across all environments. As a result, it is desirable to have a set of complementary technologies that together can provide acceptable performance across all reasonable circumstances. For example, in significant live field deployments to date, location technologies based on uplink time difference of arrival (U-TDOA) techniques have proven to provide excellent performance in urban, suburban and indoor environments. The U-TDOA technologies do not require modifications to handsets, and so performance for existing mobile stations has proven to be excellent in these same environments. In some rural environments, where cell site densities, network geometries, and coverage areas are very limited, the performance of U-TDOA has proven to degrade without the assistance of other location methods. The Assisted Global Position Systems (AGPS) and Advanced Forward Link Trilateration (AFLT) location technologies also have significant location capabilities, but they also have weaknesses. For example, in urban and indoor environments where reception of GPS signals becomes very difficult and sometimes impossible, the performance of AGPS technologies both in accuracy and yield degrades significantly. However, in these same urban and indoor environments U-TDOA technologies have proven to perform well because the SNR of uplink channels remains high and cell site densities are most dense. Additionally, in urban and dense suburban environments, where higher accuracies become more valuable to the carrier and subscriber but the effects of multipath become more significant, the performance of AFLT technologies is limited by their inability to mitigate the effects of multipath.

(See presentation, *GPS-Assisted Location Technology, Alpha Trial Field Test in Tampa, Fla., Mar. 9th-Apr. 2, 1999*, a copy of which is being submitted herewith in an Information Disclosure Statement.) In these same urban and dense suburban environments U-TDOA technologies have proven to perform well due to their ability to utilize advanced super-resolution techniques to mitigate the effects of multipath. Finally, U-TDOA is able to cover 100% of existing mobile stations today, including the new AGPS and AFLT capable mobiles. The AGPS and AFLT location methods, however, depend on subscribers purchasing new location capable mobile stations from a limited set of vendors.

SUMMARY OF THE INVENTION

To exploit the distinct optimal advantages in location determination of both the GPS-based performance and the infrastructure-based performance, the present invention provides the technology for the integration of information from both types of processing to locate wireless mobile communications units. To date, the system architectures implemented for the diverse localization approaches have not readily supported the information integration needs. Rather the system designs have been distinctly focused upon the derivation of the location-related data exclusively for either the GPS calculations or the infrastructure-based calculations, but not both. The functional directives, the signal reception approaches, and the facility and approach to extract and analyze the location-related information have been uniquely oriented to one form of system solution or the other, but not both.

For example, in one presently preferred implementation of the invention, the location of a mobile station (MS) equipped with embedded GPS signal reception capability is determined using both GPS data and extracted location-related signal characteristics. The inventive method includes the steps of receiving GPS data at a land station, the GPS data being received from a MS to be located; at a land station equipped with location-measurement facilities, receiving from the MS to be located a communications-band signal, and using the location-measurement facilities to extract location-related characteristic data from the communications-band signal; and at a land station equipped for location-determination calculations, performing location-determination calculations using the GPS data and the extracted location-related characteristic data to derive an estimated location for the MS. In addition, the method may further include providing assistance data to the MS to be located. The assistance data enables the MS to receive GPS coarse/acquisition (C/A) signals and extract TOA or pseudorange measures, which can then be communicated to the land station equipped with location-measurement facilities. Further, where the GPS data and the extracted location-related characteristic data are provided at separate land stations, these may be communicated to the land station equipped for location-determination calculations, thereby enabling the location-determination function to be carried out. As explained below, the location-related characteristic data extracted from the communications-band signal may include time of arrival (TOA) data, time difference of arrival (TDOA) data, angle of arrival (AOA) data, signal strength or propagation loss (PL) data, and/or timing advance (TA) data. In addition, the inventive method may advantageously include the use of collateral information in performing the location-determination calculations. Finally, the method may advantageously be employed to achieve applicable Federal Communications Commission (FCC) accuracy requirements for E-911.

These and other innovative approaches of the present invention for the jointly integrated exploitation of all relevant collected data are presented in the detailed descriptions that follow.

DETAILED DESCRIPTION OF ILLUSTRATIVE EMBODIMENTS

We will now describe exemplary embodiments of the present invention, beginning with an overview of the inventive integrated wireless location approach. Following this, we discuss Assisted GPS (AGPS), functional interactions between and among system components, location-dependent measures, GPS satellite space vehicle (SV) transmitter locations, time base alignment, four-parameter location determination, differential GPS, probable location determination, collateral information, coordinate relations, constrained TDOA/FDOA, enhanced GSM synchronization, and hybrid system for increasing capacity/service levels.

Overview: Integrated Wireless Location Determination

The present invention provides technology for the determination of the location and motion of a wireless communications mobile station (MS) device, such as a cellular telephone or personal digital assistant, or the like. The location parameters are determined through the integrated evaluation of location-related radio-frequency (RF) signal characteristic measurements for a combination of Global Positioning System (GPS) signals together with communications infrastructure signals and associated, location-indicative, collateral, infrastructure and environment information. Through GPS receiver facilities embedded within the communications device to be located, GPS satellite space vehicle (SV) signals are received to support the determination of the MS location. The characteristic GPS measurements of primary interest are times of arrival of the SV signals in the GPS transmission band(s) at the position of the receiving MS. Additionally, the inherent communications facilities in the MS device as well as in the communications system infrastructure equipment deployed at land station (LS) sites provide communications-band signals that are also processed for the calculation of location-related parameters. These infrastructure-based signal characteristics include times or time differences of signal arrival (TOAs or TDOAs), angles of signal arrival (AOAs), received signal power levels (at the MS and/or at the LSs), and communications-system timing advance (TA) information for the MS of interest. The present invention describes techniques that enable and apply the integration of measurement information regarding both types of signals, i.e., in both GPS and communications frequency bands, for determination of an optimal estimate of the MS location. Additionally the robustness or effectiveness and the accuracy of the present invention may be further advanced through the integration into the location calculations of supplemental or collateral information that provides further conditional or probable indication of the potential MS location other than that associated with direct signal characteristic measures.

Figure 1:
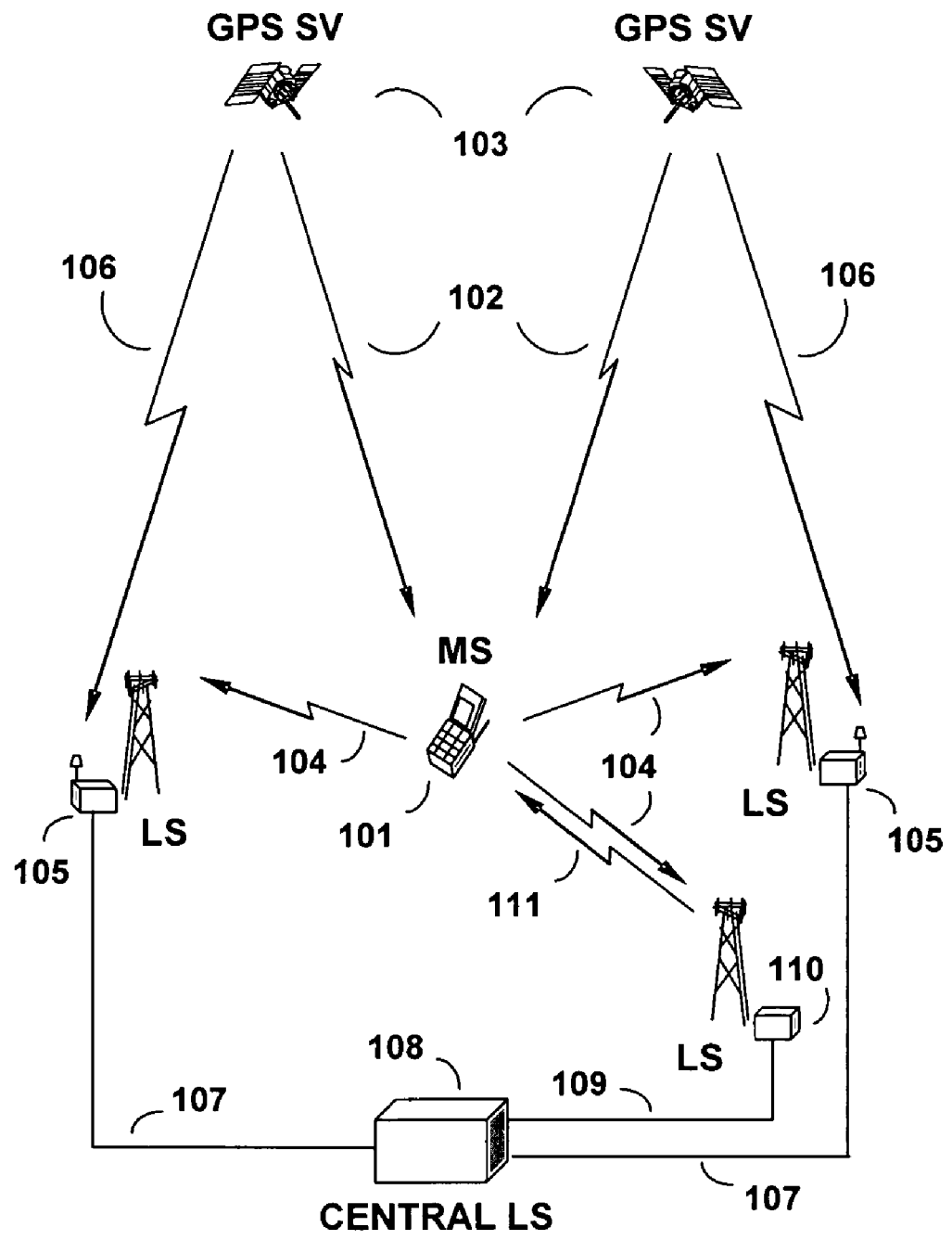
FIG. 1 depicts the components of one embodiment of the present invention, along with their inter-communication paths.

As represented in FIG. 1, the present invention determines a location for an MS that has embedded facilities for the reception of GPS signals as well as for the transmission and reception of wireless communications signals in accord with the signal formats and protocols of a wireless communications system (WCS). The MS 101 receives GPS signals 102 transmitted from GPS SVs 103. The MS also transmits wireless communications signals 104 that are received at LSs 105, which are equipped with wireless communications antenna structures. These LSs 105 are also equipped with measurement units to process the received signals and extract signal characteristics that are related to the location of the MS. These LSs 105 are additionally equipped with GPS receivers for the reception of GPS signals 106. Typically these LS facilities are installed at the same physical cell locations where the base transceiver stations (BTSs) of the cellularized WCS infrastructure are implemented. The LSs are networked through links 107 that enable the communication of the location-related measurements and GPS data to a central LS 108 for the integration of all relevant data in the determination of the MS location. Typically these logical data links 107 are overlaid upon the inter-station data links of the underlying WCS, and the central LS facilities are installed at the same physical LS where the mobile switching center (MSC) of the cellularized WCS infrastructure is implemented. The central directive or request to the MS to provide its received GPS signal data is communicated to the MS through a WCS data link 109 to a WCS BTS/LS 110, which is the WCS LS currently serving the MS. This serving cell LS 110, which is the optimal cell for the MS to communicate its own GPS data to the central LS 108, may not necessarily be equipped with the same signal characterization facilities as are at the location measurement LSs 105. The wireless request 111 sent to the MS from the LS 110 may also include supporting or assisting information described below, which can enhance the GPS sensitivity and response time of the MS. This GPS assistance information is developed in the LS network from timely support analysis of the current GPS configuration.

Figure 2:
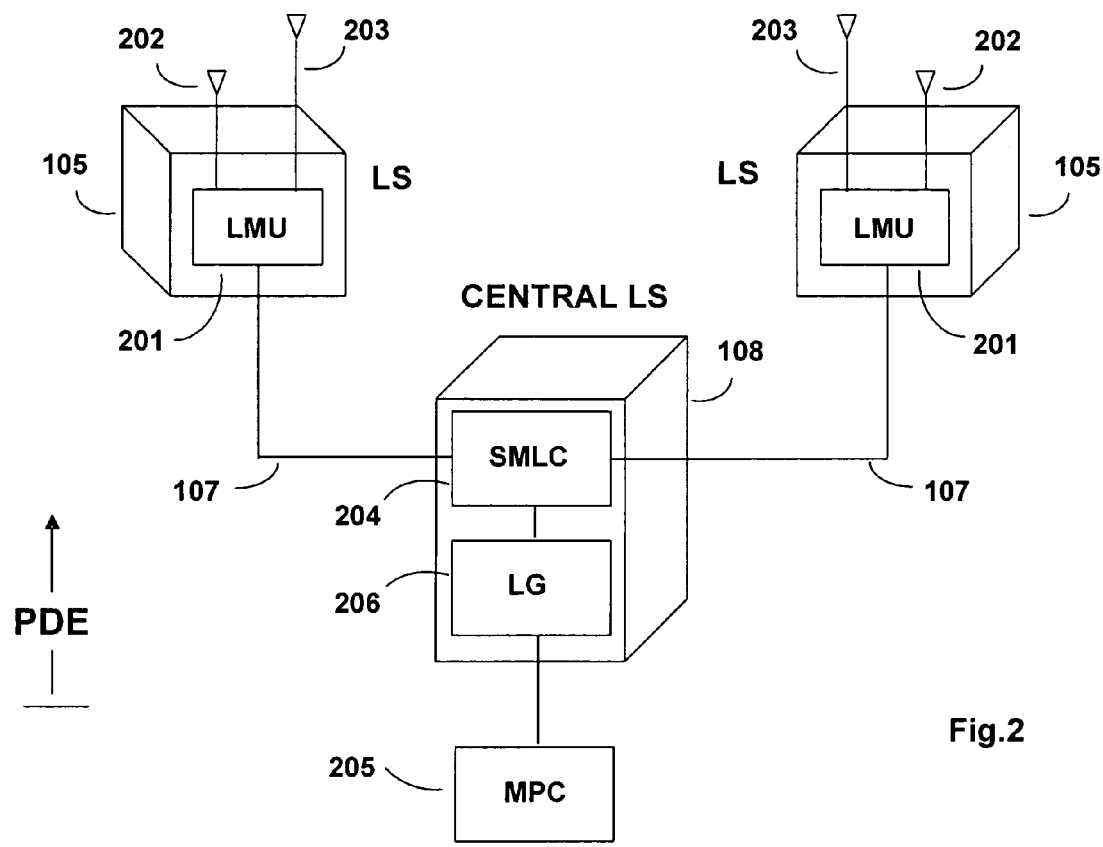
FIG. 2 shows the inter-connectivity of the location-determination processing components.

Infrastructure-based location-determination systems exploit signal processing and data analysis facilities in LSs and/or the MS for the extraction and exploitation of location-related information that is obtained from communications-band RF signals transmitted between the MS and the WCS infrastructure equipment. As represented in FIG. 2, the location measurement unit (LMU) 201 is the position-determination equipment (PDE) infrastructure device that is embedded at a networked LS 105 for signal detection and processing. In a preferred embodiment of the present invention, each LMU is connected to and receives signals from a GPS antenna 202 and from wireless communications band antenna(s) 203. The serving mobile location center (SMLC) 204 facilities at a "central" collection-and-analysis LS 108 assemble the appropriate measurements from the LMU network to calculate the MS location. As described below, the SMLC can further exploit additional, collateral or supporting, location-indicative information inferring probable MS locations. Such collateral information enhances the efficacy or even enables the completion of disambiguated location calculations. In response to any particular location request from a mobile positioning center (MPC) 205, which specifies the identity and serving WCS assignment data for the MS of interest, the appropriate SMLC for the request is selected through a location gateway (LG) 206 that implements the PDE portal for the reception and authorization of the request and for provision of the location-determination results. Descriptions of such technologies for the determination of the locations of mobile stations operating within a wireless communications network such as a cellular telephone system, a Personal Communications System (PCS), or a Global System for Mobile Communications (GSM) are extensively described in the prior art referenced herein. Such systems derive the location of the MS of interest through the exploitation of measurements of TDOAs, TOAs, TAs, received-signal power levels, and/or AOAs, any or all of which can be augmented with other supporting collateral information. As represented in the prior art, the extracted measurements can be obtained and evaluated to derive a desired MS location relative to the accurately known land-based locations of the cooperating infrastructure equipment.

The GPS enables calculation of an MS location based upon TOA measurements and the associated "pseudoranges," which a GPS receiver embedded in the MS extracts from the signals continuously transmitted from the constellation of orbiting SVs. Reception of the GPS signals also involves measurement of the Doppler shift associated with each received SV signal, and the Doppler values support determination of the motion of the receiving MS. The prior art of record, including the initial notice of proposed rule making (NPRM) under the U.S. Federal Communications Commission (FCC) Common Carrier Docket Number CC 94-102, describes the use of GPS receivers embedded in the MSs operating under a WCS to provide the MS locations upon request, e.g., for enhanced public safety response to an emergency communication.

Assisted GPS (AGPS)

The simplicity, efficiency, sensitivity, and response time of an MS GPS receiver can be enhanced through the use of assistance obtained from an infrastructure of one or more supporting stations. As represented in the referenced and incorporated GPS descriptions cited herein and similar, related literature, the standard (e.g., non-military) GPS receiver receives the GPS SV coarse/acquisition (C/A) signals and extracts TOA or pseudorange measures through correlative signal processing that is based upon the known transmitted signal waveforms. The basic GPS C/A signal consists of a navigation message that is formed by the code division multiple access (CDMA) encoding of a 50 bit per second (bps) data stream. Each SV is uniquely associated with a 1023-bit code or pattern of "chips," which is applied in the encoding of the C/A message at a 1.023 million chips per second (Mcps) rate. Thus the C/A code repeats every 1.0 millisecond (msec) in the SV transmissions and 20 such repetitions are included for each transmitted bit. The CDMA demodulation process applies matched replica correlation to detect the presence of the code in the received signal, with correlation delay lags covering the possible domain of TOA, at a time resolution inversely proportional to the effectively processed signal bandwidth. For the standard SV orbits, the signal propagation time from an SV to a MS on or near the earth's surface falls in the domain from 67 to 89 msec, i.e., spanning a window under 22 msec with dependence upon the orientation from the MS to the SV (closer for an SV overhead and farther for SVs at the horizon). The possible domain of Doppler shifted frequency differences, ranging from minimal for SVs over head to nearly 4.5 kilohertz (kHz) for SVs at the horizon, must also be covered in the signal correlation calculations, at a Doppler frequency resolution inversely proportional to the effective coherent integration time of the correlation. Finally these signal correlations must be accomplished for each SV signal, with its unique CDMA code, that the MS receiver is attempting to receive. The need for a GPS receiver to search over this potential parametric diversity extends the response time to first fix (TTFF) within which the receiver can develop a location estimate or successfully acquire contact with the suite of available SV signals. All of these signal processing search domains can be simplified through assistance provided by a supporting infrastructure.

With the AGPS processing, the MS can take advantage of assisting information obtained from a network of one or more supporting station(s) and communicated in the request message 111 of FIG. 1 via the communications facilities embedded within the MS. The fundamental approach for AGPS implementation is described in Taylor, et al., U.S. Pat. No. 4,445,118, incorporated herein by reference. In a preferred embodiment of the present invention, from GPS monitoring stations with LMUs at infrastructure LSs that are in the same general vicinity or operational area as the MS, a supporting set of information can be communicated in the message 111 to the MS to indicate which SVs are currently overhead or above approximate horizon to warrant a candidate correlative search, what approximate and limited domain of Doppler frequency shift is reasonable for each candidate SV search, and what approximate and limited domain of TOA is reasonable for each candidate SV search. In this embodiment of the invention, an LS can support such indications of available SV numbers and associated Doppler and delay search windows through the use of its own LMU-embedded GPS receiver and signal monitoring evaluations, which continuously sense and evaluate the information and characteristics of the currently available SVs in the GPS constellation. These indications can also be augmented or obtained through a network with other GPS receiving and monitoring stations. In this embodiment, the assisting information is provided to the MS through the embedded WCS facilities in the MS and in the WCS LSs. As noted in Taylor, et al., U.S. Pat. No. 4,445,118, the processing burden on the MS can also be and preferably is further alleviated through implementation of the location-calculation function in the supporting infrastructure of the PDE. With this embodiment, the MS of the present invention uses its embedded communications facilities to provide to the LS infrastructure its own derived GPS pseudorange measurements, but the MS is not required to also provide a GPS-derived location. If the communications burden of the location-determination support is not a factor in WCS loading and response times, then the MS can also optionally provide its demodulated associated SV navigation message data and/or its calculated MS location or SV locations and clock information as available. The LS infrastructure then completes the optimal integration of the GPS information provided by the MS together with the independently derived infrastructure-based LMU measurements and all relevant and available collateral information to determine the MS location.

Major Functional Interactions

Figure 3:
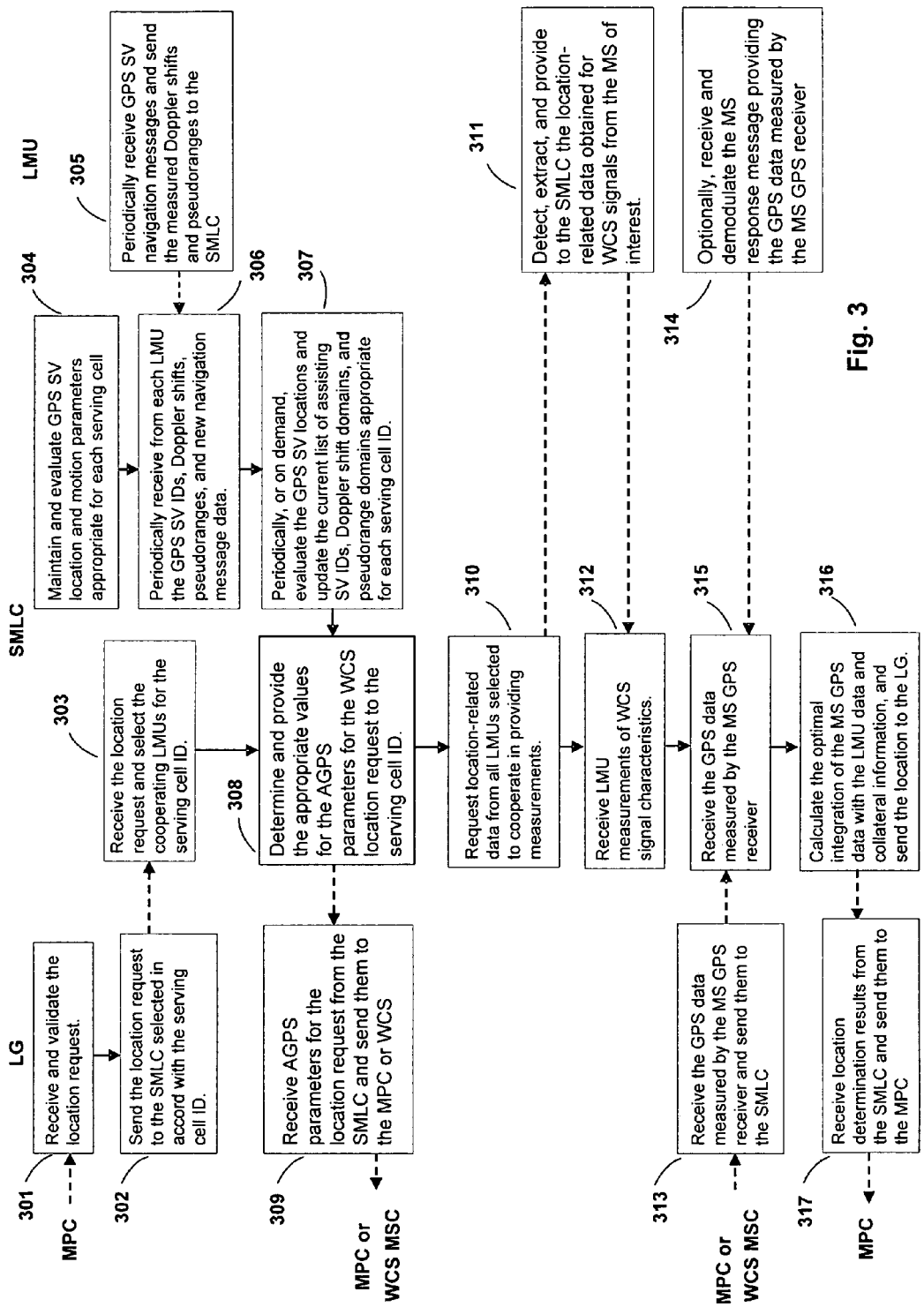
FIG. 3 illustrates the major functions and their interactions performed for the determination of the location estimates that optimally integrate GPS data and infrastructure information.

A presently preferred embodiment of the present invention implements the primary functions represented in FIG. 3. FIG. 3 depicts the significant functionality of the dominant components of the PDE of FIG. 2, i.e., the LG, the SMLC, and the LMU. The request for the location of a particular MS of interest originates at a logical component called the mobile positioning center (MPC), which is external to the PDE. The LG 301 receives the location request, and validates the authenticity and authorization for it. A valid request identifies the WCS serving cell and associated communications protocol parameters, including assigned frequency usage, that shall apply for the WCS communications with the MS. The LG 302 provides the request to the SMLC that is appropriate for the determination of locations for MSs operating in the vicinity of the WCS serving cell. The selected SMLC 303 receives and reviews any request to determine the list of cooperating LMUs that are optimal for supporting location requests associated with the identified serving cell. In antici-pation of the need to rapidly support a request for assisting GPS data, the SMLC 304 also routinely maintains and evaluates current GPS configuration data that specify the location and motion parameters for the GPS SVs. These data are persistently monitored by the LMUs 305 through their GPS receivers. The LMUs provide to the SMLC the Doppler shifts, pseudoranges, and relevant demodulated navigation message data for the GPS SV telemetry streams received at the LMU positions. The SMLC 306 receives these GPS SV data periodically communicated from the LMUs. For each potential serving cell, the SMLC 307 periodically or on demand evaluates and derives a current list that specifies the optimal SVs in potential view near the cell site, along with the restricted domains of Doppler shift and pseudorange that are anticipated to be appropriate for assisting in an AGPS reception.

The preferred embodiment of the present invention exploits the availability of the up-to-date descriptions of the GPS configuration parameters to support a reduced TTFF from the MS GPS receiver. The SMLC 308 rapidly responds to a particular location request and provides the AGPS parameters appropriate for the vicinity of the serving WCS cell site. These AGPS parameters are received by the LG 309 and are provided to the MPC and/or the MSC to be communicated to the MS in its GPS data request 111. With the integrated approaches of the present invention, the SMLC 310 also proceeds to request the development of data related to the MS location from all LMUs that are optimally configured to cooperate in the determination of locations served by the identified cell site. In accord with a response to the SMLC requests, the LMUs 311 apply their signal acquisition and processing facilities to detect and extract the data appropriate for support of the location-determination calculations. These LMU data are then provided to and received by the SMLC 312 for integration into the location processing.

In support of the location determinations, the GPS data relevant to the MS location is sensed by the MS receiver with whatever assistance its processing facilities are configured to exploit. The MS develops this data in response to the request 111, and communicates the data to the serving cell site 110 for inclusion in the location calculations. The MS's GPS data may be provided to the PDE by way of the WCS, either through the MPC or directly from the MSC. The LG 313 can receive these data from the WCS or, optionally, the LMUs 314 may receive, demodulate, and provide the MS's GPS data from the MS response message. The SMLC 315 receives the GPS information that the MS has provided for insertion into the integrated location-determination calculations.

With the data received from the LMUs 312 and from the MS 315, the SMLC 316 integrates all of the data in deriving an optimal probable estimate for the MS location parameters. As described further below, the location-related measurements obtained from the cooperating LMUs may include data of various forms and positional sensitivities from LMU positions and equipment that support various individual accuracies. Also as elaborated further below, the GPS data may individually define or support stand-alone data location, with potential correctable biases, or may only provide pseudorange and Doppler measurements for a limited, incomplete set of SV signals due to occlusion or distortion of the GPS signal propagation paths. The SMLC 316 combines all of the data provided, and integrates them into probability-based evaluations that incorporate whatever additional relevant collateral information is available to further condition the location estimate. The approaches and techniques appropriate for these integrated evaluations are presented in the following descriptions. The resultant estimate for the MS location is provided to the LG so that the LG 317 can route the information to the MPC in response to its original location request.

Location-Dependent Measures

With accuracy sufficient for the techniques and applications addressed herein, a measurement of a time of signal arrival (TOA) at a receiving position is directly related to the distance between the location of signal reception and the location of signal transmission. The signal transmitter-to-receiver distance, $D_{TR}$, spanned in the propagation of the transmitted signal is represented as the straight-line vector length between the transmitting and receiving locations, $x_T$ and $x_R$, represented in an earth-centered, inertial (ECI), three-dimensional, Cartesian coordinate system:

$$D_{TR} = |\underline{x}_T - \underline{x}_R| \tag{1}$$

The transmitter-to-receiver signal propagation time interval, $t_{TR}$, is the difference between the time of arrival, TOA, and the time of transmission, TOT, and is equated to the signal propagation distance, $D_{TR} = |\underline{x}_T(TOT) - \underline{x}_R(TOA)|$, divided by the RF signal speed of propagation (i.e., the "speed of light"), c:

$$t_{TR} = TOA - TOT = D_{TR}/c = |\underline{x}_T(TOT) - \underline{x}_R(TOA)|/c \tag{2}$$

where $\underline{x}_R(TOA)$ is the three-dimensional vector coordinate representation of the receiver position at the "epoch" or time TOA, and $\underline{x}_T(TOT)$ is the vector coordinate representation of the transmitter position at epoch TOT. In systems that exploit RF signal propagation time relations such as expressed in (2), the (constant) propagation speed, "c," may be multiplied by the fundamental time measurements to render the measurements directly in units of distance or length. In synchronized location-determination systems such as the GPS, the TOT for the received signal interval is defined, controlled, and known with respect to a specified and precisely maintained time standard, e.g., GPS time or the related Universal Time Coordinated (UTC). An MS using an embedded GPS receiver is designed to receive the GPS signals that are transmitted at known times from the SVs, whose positions can be calculated from transmitted orbit-determination parameters. A land-based infrastructure that determines MS locations by exploiting TOAs measured at separated LS locations for signals transmitted by the MS or at the MS for signals transmitted by the LSs uses time-base synchronization (e.g., synchronized to GPS transmissions) to coordinate the clock standards for separated LS receiving stations and/or time commonality to associate separate signal receptions at the MS. Through the exploitation of time measurements and their relationships to RF signal propagation distances between transmitter and receiver position, the position of a MS that receives and/or transmits the various signals can be determined.

Similarly, other mathematical relations relate other types of measurements (e.g., of TDOAs, TAs, power levels, and AOAs) to the MS location coordinates of interest. As another exemplary distance-related measure, a TDOA measurement provides a measure of the difference between two TOAs for two different and distinct signal receptions. For a TDOA measurement extracted from a common transmitted signal interval that arrives at distinct receiving stations, positioned at separate locations $\underline{x}_{R1}$ and $\underline{x}_{R2}$, the difference in times of arrival, $TDOA_{21}$, is directly related to the difference in signal propagation distances, $D_{R2}$ and $D_{R1}$:

$$TDOA_{21} = TOA_2 - TOA_1 \tag{3}$$

-continued
$$= (D_{R2} - D_{R1})/c$$
$$= [|\underline{x}_T(TOT) - \underline{x}_{R2}(TOA_2)| -$$
$$|\underline{x}_T(TOT) - \underline{x}_{R1}(TOA_1)|]/c$$

Exploitation of such TDOA measurements for the determination of a transmitter's location does not require apriori knowledge of a common TOT instant or epoch at which the signal of interest was emitted. This feature is beneficial in the use of typical communications system transmissions for which the times of transmission are not necessarily synchronized between MS and multiple LS time bases.

The TA parameter for an MS, which is measured and applied for communications system synchronization, is also directly related to the distance of signal propagation from a controlling LS to the MS of interest, and back, i.e., the MS senses a signal transmitted from an LS, synchronizes itself to this signal, and emits a responding transmission in cooperative time alignment that is sensed at the LS. Since the received, round-trip, timing alignment offset sensed at the LS, excluding any MS response circuit delay, is approximately proportional to the two-way propagation time between the MS and the LS, the $TA_{MS}$ is set to this offset and is directly related to twice the location-related propagation distance, $D_{ML}$, between the MS and LS locations:

$$TA_{MS} = 2D_{ML}/c = 2|\underline{x}_{MS} - \underline{x}_{LS}|/c \tag{4}$$

The distance-related, measured, power level of a received signal is reduced from its transmitted level by a loss factor, $L_{TR}$, for its propagation as emitted from the transmitter and sensed by the receiver. With the use of assumed or known values for other related, contributing factors, this loss factor can provide a measure of the signal propagation distance, $D_{TR}$, through a modeled representation of the propagation environment:

$$S_T/S_R = L_{TR}(D_{TR}, \ldots) = G \cdot PL(D_{TR}) = G \cdot PL(|\underline{x}_T - \underline{x}_R|) \tag{5}$$

where the $S_R$ and $S_T$ measurements are the received and transmitted signal power level measures, G is a distance-independent factor encapsulating other contributing factors such as receiving and transmitting antenna "system" gains in the relative directions of signal propagation, and $PL(\ )$ is a distance-dependent model of the environmental path losses for the propagating signal strength between the deployed transmitting and receiving antennas. For a simple, spherical-spreading model, $$PL_{sph}(D_{TR}) = [4\pi D_{TR}/\lambda]^2 \tag{6}$$

where $\lambda$ is the wavelength of signal propagation. The distance differences for GPS signal propagations from SVs to a receiving MS are proportionately small, and significant variability exists in GPS signal propagation from the different SVs, with ionospheric and atmospheric effects and with multipath reflections near the MS. These characteristics typically render the use of received GPS power levels inconsequential for MS location determination. However, for the determination of an MS location with power levels measured for land-based propagations between an MS and one or more LSs, the location calculations can make effective use of an empirically validated propagation loss model such as Hata's representation of Okumura's data, as documented in the following article, which is incorporated herein by reference: *Empirical*

*Formula for Propagation Loss in Land Mobile Radio Services*, M. Hata, IEEE Trans. Veh. Tech., Vol VT-29, No. 3, August 1980.

Due to vagaries in environmental and multipath propagation conditions, empirical measurements of power levels conform with more nearly normal or Gaussian distributions when quantified in logarithmic units of dBs. Thus the multiplicative factors in the expressions for PL( ) of Hata and other such models are typically represented as additions and subtractions of logarithm terms. In particular, the loss model of relation (5) associates the dB loss expressed in terms of the location-dependent distance to the measured dB difference between transmitted and received power levels. This relation can be asserted for location determination when the transmitted power level is known by command control from an affiliated communications system. However, a transmitted level may not be known or available from measurement. In this case, the ratio of received levels for the common transmitted signal that is received by two separate receivers can be exploited as a measure related to the ratio (or dB difference) for the two position-dependent distances between the transmitting and the receiving stations. The power level ratio or dB difference is adjusted for gain factors specific to each reception location. Such use of received power ratio or dB difference does not require available information regarding the common transmitted power level. With the modeled distance dependencies, including logarithmic expressions, MS location-dependent information can be extracted for transmissions from one or more LSs to an MS and/or from an MS to one or more LSs.

In addition to the distance-related measures described above, signal AOA measurements also provide MS location-dependent information, and this type of information is nominally independent of the signal propagation distance. Since measurement of an AOA requires the availability of a directionally sensitive, receiving, antenna structure at the reception location, the AOA is typically extracted for a signal transmitted by the MS and received at a LS. Thus the AOAs are measured for communications-band signals propagated "horizontally," approximately along the earth's surface. An AOA may be typically represented as the angle of the direction from the point of reception toward the incoming signal, quantified relative to the known fixed direction of true, geodetic North. This relation may be expressed as $$AOA_{TR} = \operatorname{atan2}[(\underline{x}_T - \underline{x}_R)_E / (\underline{x}_T - \underline{x}_R)_N] \quad (7)$$

where atan2[ ] provides the complete four-quadrant arctangent, and $(\ )_E$ and $(\ )_N$ represent the East and North components for the vector directed toward the transmitter location $\underline{x}_T$ from the receiver location $\underline{x}_R$. Such a measure provides information regarding the locus of the possible or probable transmitting MS locations along the line of bearing (LOB) sensed at the receiving LS, and the measure is nominally independent of the distance along the LOB from the LS to the MS location.

GPS SV Transmitter Locations

With the location-dependent relations described above, the determination of an MS location requires knowledge of the transmitter locations when the MS is the point of signal reception, as in GPS and some forms of infrastructure systems measures, and requires knowledge of the receiver locations, when the MS is the transmitter. The locations of fixed LS receiver locations can be precisely determined by survey, including GPS-based survey. The accuracy of MS locations determined from measurements involving LSs is directly related to the accuracy with which the LS locations are known. Of particular significance for the exploitation of GPS time measurements, the limitation in the accuracy to which a MS location is determined is dependent upon the accuracy to which the SV transmitter positions are known and represented.

The GPS SV positions and velocities at any instant or epoch are described and determined in accord with the ephemeris parameters that are communicated from the GPS in the SV navigation message transmissions. Descriptions of the mathematical relations involved in the representation and calculation of the SV elliptical-orbit positions and velocities from the ephemerides are available in texts such as those following: *Global Positioning System, Theory and Practice*, 5th Ed., Hofmmann-Wellenhof, Lichtenegger, and Collins, Springer-Verlag, 1994; *Global Positioning Systems, Inertial Navigation, and Integration*, Grewal, Weill, and Andrews, John Wiley, 2001. As noted in these texts, the SV ephemeris parameters are used to produce SV location and motion parameters expressed in accord with the World Geodetic System 1984 (WGS 84) description of the earth's shape and other physical properties.

For each GPS SV, the ephemeris parameters include the satellite pseudo-random number (PRN) identity, the specification of the GPS reference epoch for which the parametric values are specified, the Keplerian orbital parameters, and the parameters specifying the planar alignment of the Keplerian ellipse and its perigee. The ephemeris defines the SV location and motion with respect to the earth-centered, earth-fixed (ECEF) coordinate system, which is itself rotating with respect to the solar-fixed (inertial), vernal-equinox based, ECI coordinate system. While the ephemeris parameters in the GPS almanac data provide the multiple-kilometer accuracy appropriate for acquiring signal contact, it is the broadcast ephemeris from each SV (sans the dither or truncation of selective availability, SA) that typically enables the calculation of the SV's particular ECEF Cartesian position to within a few meters, when used for observation epochs within the appropriate four-hour epoch window from the reference epoch.

The proper characterization of an SV position is evaluated at the "retarded solution" time for each SV for which a pseudorange measurement is available, i.e., as represented in relation (2), a GPS reception near the earth's surface provides a TOA, but the signal propagation distance from the SV is associated with a TOT epoch that is ~78±11 msec before the TOA epoch at which the signal was received. During the propagation time, an SV advances ~300±40 meters (m), and thus each SV location is evaluated in the location-determination calculations at its appropriate TOT for each measured TOA.

Time Base Alignment

As noted in the relations above, for determination of the location of an MS at a specific instant, the times of reception and/or transmission of the signal intervals of interest must be appropriately acquired and tagged to the processed signal data. The time base for GPS, called GPS time, is maintained in accurate synchronization with the standard defined at the U.S. Naval Observatory. The GPS transmissions of each SV occur at instants in synchronization with a time-base established by that SV's clock. GPS ground stations around the world monitor the position, time synchronization, and health of each SV, and provide correction terms to the SVs that describe "current" time alignment corrections for the accurate interpretation of the SV transmissions in synchronization with the GPS time standard. These time correction parameters, to second order, are included in the navigation messages transmitted from the SVs.

Four-Parameter Location Determination

With the technology described in the present invention for exploiting the joint combination of GPS and associated infrastructure measurements and collateral information, the position, x, of the MS of interest is determined for a particular instant in time, relevant to the measurements and information from which it is derived, i.e., the MS location is not typically or necessarily presumed or constrained to be constant in time, but rather is taken to be a function of time, x(t). An example of this is represented in relation (2). When a GPS signal is received at the MS and its TOA is measured, the time measurement is quantified relative to the time base clock embedded in the GPS receiver. As with the SVs, the time base of the MS receiver is not inherently synchronous with GPS time, e.g., the MS time base may be, at least, offset (zeroth order correction) and drifting by clock frequency difference (first order correction) from that of GPS. Thus a fundamental TOA measurement, labeled or "tagged" in accord with the MS time base, is potentially biased relative to its "true" value aligned with GPS time. Hence the fundamental TOA measurement in a GPS receiver is said to provide a measurement of "pseudorange" (rather than true range or distance), when used in relation (2) before determination of the MS clock bias or offset for that measurement.

The present invention can mitigate the typical necessity for a GPS-related location determination to have available at least four, distinct, independent pseudorange measurements. For the stand-alone GPS receiver, the four measurements or position-determining data are required for the completion of the location calculation to derive the MS three-dimensional coordinate position along with the MS clock bias. With the present invention, any available pseudorange measurements are integrated into the location calculations, together with whatever relevant location-related measurements are available from infrastructure-based equipment and whatever other relevant location-related collateral information is available about the probable MS location.

Differential GPS (DGPS)

As represented in the referenced GPS descriptions, the accuracy of location-determination calculations exploiting GPS pseudorange measurements can be corrected for some systematic biases through the application of differential GPS (DGPS) adjustments, e.g., such systematic biases are present when GPS management introduces SA, intentionally dithering or truncating the transmitted time base or ephemeris parameters in the SV navigation message. Other biases may be present when the ionospheric correction parameters, i.e., the propagation group delays communicated in the SV navigation message, do not accurately represent the conditions encountered along the propagation paths. Biases such as these can be mitigated or corrected in calculations of the MS location through the monitoring, evaluation, and application of DGPS adjustments, which are derived from a network of one or more supporting stations.

DGPS corrections for the MS location calculations are evaluated for a GPS monitoring station through comparative evaluation of currently sensed GPS measurements at the station and derived location parameters for that location. The derived values are calculated for the "known" locations of the SVs based upon their ephemerides and are evaluated in association with the "known" values for the support station location. In preferred embodiments of the present invention with the use of fixed/stationary LSs as the supporting DGPS reference stations, the known LS locations are those obtained through accurate geodetic surveys. These surveys are based upon and referenced to GPS-derived values from long-term integrations of GPS signals. When the MS is able to receive and extract GPS pseudorange measurements from enough SVs to produce a stand-alone GPS location, then a nearby supporting LS that receives essentially the same SV signals can apply the difference between its currently calculated location for its own position and its apriori known location, as a direct correction to any derived GPS location for the MS.

More fundamental to the preferred embodiment, the totality of any corrections available from the network of supporting LSs is collectively applied to the MS measurements. The MS communicates its observed pseudorange measurements to the supporting LS infrastructure for integration into the infrastructure calculations of the MS location. Each pseudorange measurement can be corrected in accord with the difference observed at some nearby supporting reference LS between its own currently observed pseudorange measurement from that same SV and the current value that would conform with its apriori known location, given the associated current common SV clock bias and ephemeris parameters being transmitted in the SV navigation message. Such differential corrections mitigate the effects of local systematic biases in the pseudorange measurements and enhance the accuracy of the derived MS location.

Probable Location Determination

With the technology described herein, an optimum estimate of a MS location is derived from the totality of the location-related information available for its determination. The location-related information is available in measurements of received signal characteristics and in collateral information that indicates the relative probabilities or likelihoods of potential MS locations. Probability-based techniques for the estimation of position-state parameters are well known to those skilled in statistical estimation processes and well noted in typical discussions of estimation theory, such as presented by Harry L. Van Trees in section 2.4 of Part I of his discussions in *Detection, Estimation, and Modulation Theory, Parts I-IV*, Van Trees, John Wiley, 2001. As represented in the descriptions referenced herein, the relative conditional probability or likelihood of a candidate estimate of a "state vector" of location parameters, x, conditioned upon the information inherent in a vector set, z, of measurements, can be related through Bayes probability relations to the relative probability of occurrence of the measurements under condition of the state and the apriori probability of the state. This probabilistic relation may be typically expressed as:

$$p(\underline{x}|\underline{z}) = p(\underline{z}|\underline{x})p(\underline{x})/p(\underline{z}) \tag{8}$$

where $p(\underline{x}|\underline{z})$ represents the probability that the state vector components are those evaluated for x under the condition that the observations have the values actually obtained for the measurement values in $\underline{z}$, $p(\underline{z}|\underline{x})$ represents the probability that the values of the vector $\underline{z}$ would be observed under the condition that the state variables are of the values in $\underline{x}$, $p(\underline{x})$ is the total (marginal) relative apriori probability that the state values of x would occur, and $p(\underline{z})$ is the total (marginal) probability that the measured parameter values occur for the observation vector, $\underline{z}$. In a derivation of the positional solution or estimate of optimal likelihood or relative probability, location-independent factors such as the $p(\underline{z})$ term are inconsequential.

With the standard statistical considerations involved in the association of probabilities for independent data elements, the jointly combined probability or likelihood of the independent data elements together is the product of the probabilities of the independent data sets alone, e.g., with the technology of the present invention, the assembly of data of various types from diverse sources integrates statistically independent data.

When the maximum of the likelihood is derived via the maximum of the logarithm of the likelihood, then the product likelihood relation is accumulated as the sum of the "log likelihoods."

The parametric location solution for the maximum or most likely value is typically derived by sampling or calculating the likelihood function value for a grid or set of discrete location parameter values that span the complete domain of possible values. The sampling interval or grid spacing typically is started at a coarse mesh that is sufficient to indicate the local region(s) of potentially optimum value, and then the mesh of the sampling grid is progressively refined in subsequent iterations that are focused in the optimal regions of limited extent. The ultimate results are evaluated to the resolution that the contributing measurement accuracies support. With complementary procedures as described for the statistical analyses in the referenced texts, gradient-based calculations can be applied in focusing upon the regions of optimal value and upon the inherent resolution supported by the measurements. In addition to the descriptions of statistical location-determination calculations cited in the above references, further descriptions are available in the discussions of Harold W. Sorenson regarding parametric estimation in general and of Roy E. Bethel regarding the proper evaluation of discretely sampled likelihood functions for location determination: *Least-Squares Estimation: From Gauss To Kalman*, H. W. Sorenson, IEEE Spectrum., No. 7, July, 1970; and *A PDF Tracker*, R. E. Bethel, et al., IEEE Trans. on AES, Vol. 30, April, 1994; as well as in Hodson, U.S. Pat. No. 5,045,860, Sep. 3, 1991, "Method and Arrangement for Probabilistic Determination of a Target Location".

The data or information that is evaluated in the probabilistic calculations may occur with noise or uncertainty distributions of various forms. As described in the above-cited references, measurement or data-derivation systems are typically represented as producing information with normal or Gaussian distributions of errors or deviations from truth. As represented in relations (2) through (7) above, a vector, $\underline{z}$, of available location-related data may generally be expressed as a non-linear function, $\underline{h}()$, of the location state vector, $\underline{x}$, plus an additive noise component vector, $\underline{v}$. This relation is expressed in the observation equation:

$$\underline{z} = \underline{h}(\underline{x}) + \underline{v} \qquad (9)$$

The function $\underline{h}()$ is intended to accurately represent the true association between the data and the desired location state parameters. Thus the expectation value, "E()," for the noise is zero (i.e., the noise is unbiased) and, under normal assumptions, the observation uncertainties are represented by a Gaussian covariance matrix, R:

$$E(\underline{v}) = \underline{0} \text{ and } E(\underline{v}\underline{v}^T) = R \qquad (10)$$

These expressions can also be applicable when the data or "pseudo-measurement" includes a "direct" measurement of, or even a "Gaussian" constraint on, one or more of the desired state parameters, e.g., if the available data includes a GPS "measurement" of the complete state vector, then the observation function for that data is the linear identity function, $\underline{h}(\underline{x}) = \underline{x}$, and the uncertainty matrix is the positional covariance, P, which exhibits the uncertainty correlations that exist among the errors in the observed state parameters. Often, with measurements from diverse, physically distinct, measurement systems, the error distributions for each data source are presumed to be mutually independent or uncorrelated, and the corresponding off-diagonal components of the measurement covariance matrix are zero. With the above assumptions of normal statistics, then the relative probability or likelihood contribution in relation (8) for the data vector is represented as:

$$p_G(\underline{z}|\underline{x}) \approx \exp[-\tfrac{1}{2}(\underline{z}-\underline{h}(\underline{x}))^T R^{-1}(\underline{z}-\underline{h}(\underline{x}))] \qquad (11)$$

neglecting terms independent of $\underline{x}$. Under alternative circumstances, when the measurement data errors are less compactly distributed and appear to be more accurately represented by exponential or Laplacian statistics, then, for independent, unbiased measurements with a diagonal mean square deviation matrix, $$E(v_m v_n) = \sigma_m^2 \delta_{mn} \qquad (12)$$

where $\delta_{mn} = 1$ when m=n and is zero otherwise, the relative probability or likelihood contribution for the Laplacian distributed data vector is represented as:

$$p_L(\underline{z}|\underline{x}) \approx \exp[-\sqrt{2}(\underline{\sigma}^{-1})^T(|\underline{z}-\underline{h}(\underline{x})|)] \qquad (13)$$

again neglecting terms independent of $\underline{x}$, and using "$(\underline{\sigma}^{-1})$" to denote a vector with components equal to the inverse of the rms error expectations, $\sigma_m$ and "$(|\underline{z}-\underline{h}(\underline{x})|)$" to denote a vector with components equal to the absolute values of the individual measurement innovations or residuals, $(|\underline{z}-\underline{h}(\underline{x})|)_m = |z_m - h_m(\underline{x})|$. Relations such as (11) and (13), and similar treatments of likelihood factors for heuristically observed error distributions, provide a fundamental manner for integrating the contribution of diverse observations into the probabilistic determination of the optimal values for the location parameters.

As described above in the discussions regarding GPS and associated coordinates and measurements, the state vector $\underline{x}$ will typically be a four-parameter vector, including three MS location coordinates and one MS clock bias coordinate, and the measurement vector will typically be a vector of four or more measurements. However, as is noted in more detail below, when apriori information regarding the probable locations for the MS is available to restrict the domain of possible locations, then the dimensionality of the measurement vector can be reduced and still result in an acceptably accurate MS location. With the application of relation (8), an optimal estimate for the MS location can be derived for the maximum probability or maximum likelihood state estimate, which maximizes the combined product probability that integrates any available collateral information and all of the available measurement information, both GPS-based and infrastructure-based.

Applying the technology of the present invention, the optimal integrations of GPS-based measurements and infrastructure-based measurements and associated information enable a MS location to be derived even when there is not sufficient information available from either the infrastructure alone or from GPS measurements alone to determine a location of useful accuracy. The typical GPS accuracy, with small circular area of uncertainty, is realized when an open view of the sky is available, so that SV signals can be successfully received from an approximately uniform distribution of satellites above and surrounding the MS. However, signal propagation conditions among the urban canyons of high-rise buildings at the centers of large metropolitan regions can result in occluded SV reception, thereby preventing reception of a sufficient suite of GPS SV signals for a stand-alone GPS solution. This condition is particularly prevalent when the MS is in a building interior and/or when the only observable SV signals are from SVs that are aligned along the arc of sky/ space that falls along a path or swath formed by the "Walls" of buildings on either side of a relatively straight and narrow street where the MS is operating. Under such a "urban canyon" scenario, the signals from the SVs might adequately indicate a long, narrow region transverse to the street where the MS location is likely, but the uncertainty of this possible region would be very large in the directions transverse to the alignment of the received SVs along the street. In other scenarios, foliage or terrain features can occlude some SV signals and prevent the measurement in the MS of the normal minimum of four SV pseudoranges. With the integration of GPS and infrastructure information in the present invention, an accurate location solution may be derived through the added information available in infrastructure-based measurements, which are extracted from communications-band signals that propagate in the predominantly "horizontal" plane between the MS and the LSs.

Collateral Information

The Bayes probability relation represented in relation (8) enables the exploitation and application of supporting collateral information in multiple complementary manners. As described above and in the reference literature, the domain of possible MS locations may be evaluated with respect to the total likelihood of occurrence, given the available measurements and related information. As represented in relations (2) through (7), each of the typical measured characteristics can be expressed as a non-linear function of the location of the MS of interest at a specific time. In addition, some types of collateral information can be expressed in one or more constraint relations for the MS state parameters, e.g., while the typical GPS solution is calculated in the three dimensions of an ECEF coordinate system, the resultant location estimate can be constrained to be at a distance from the ECEF origin at earth center that effectively places the location at (or nearly at) the earth's surface when the MS is known to be positioned near the ground terrain, rather than in flight. Such and similar constraints can be included in the probability calculations either by pre-conditioning the apriori probabilities associated with candidate locations, or by effectively including "pseudo-measurements" that express various constraints and their extent of uncertainty as a function of location.

An effective use of known statistics for the potential locations of an MS can be applied in the likelihood calculations. For the determination of the locations of cellular phones, the statistical distribution of relevant locations for the phone usage may be available from collected usage statistics or databases, e.g., the statistics of phone usage in heavy urban environments may indicate that MS phones are more likely to be on or beside the streets of the urban road network, and similarly the statistics for operations in sparsely populated rural environments may indicate that MS phones are more likely to be on or beside the highways or arterial thoroughfares passing through a rural region. An accurate representation of the roadway positions of a street or highway network may be obtained from standard map databases, including those maintained by civil authorities. Thus the imposition of an apriori distribution of probability factors overlaying the candidate domain of possible locations, e.g., in the p(x) term in relation (8), might preferentially condition the likely locations to fall on or beside the roads. For further accuracy and realism in the representation of the relevant probabilities, the two-dimensional description of the roadway locations on the earth's surface can be spatially "lowpass" filtered. This filtering can de-resolve or smooth the apriori likelihood representation so that the probabilities are indeed elevated near or on the roadways, but that the probabilities decrease slowly or are spread/smoothed out to realistic extent in directions transverse to the roadways. In fact, the effective use of available statistics in the present invention can be recursively augmented, enhanced, and applied in upgrading the probability representations as the statistics are collected from the locations derived with the present invention.

Coordinate Relations

To support the integration of GPS information together with infrastructure-based information, the common coordinate system applied in the location calculations must accurately represent both types of information. As noted above, GPS calculations are typically implemented with the use of an ECEF system of coordinates, which accurately represents the locations and velocities of the SVs and the MS of interest, on land or above. To date, coordinate systems applied in the exploitation solely of information regarding a terrain-based network of LSs for cellular phone location determination have typically invoked planar projections of the earth's surface in the local vicinity of the LSs. In such extant infrastructure-based location-determination systems, the geographic extent of the applicable operational domain of the locating system has been confined to a small enough region that the curvature of the earth's surface has not affected the observed relations to a measurable degree. The surveyed locations of terrain-based LS antennas are typically expressed in terms of geodetic latitude, longitude, and height above ground level (agl), together with the associated height of the local ground level above mean sea level (amsl). Transformations of geodetic coordinates based upon a (e.g., WGS 84) ellipsoid into a system of flat, planar coordinates typically apply conformal projections, such as the Lambert conformal conical or (universal) transverse Mercator (UTM) projections, as described in John P. Snyder's texts: *Map Projections—A Working Manual*, Snyder, U.S. Geological Survey Professional Paper 1395, US Government Printing Office, 1987; *Map Projections, A Reference Manual*, Bugayevskiy and Snyder, Taylor & Francis, 1995.

For the combination of GPS data and infrastructure information, the preferred embodiment of the present invention applies the GPS-standard ECEF coordinate system together with the reliable transformation of local altitude representations to provide an accurate representation of all of the relevant location relations. Also the GPS antenna and receiver at each LMU location provides a direct WGS 84 basis for differential comparison with the height (agl) of the communications antennas at the site. The likelihood calculations involving the relations between sensed or statistical information and the candidate MS location can be simply implemented in the three-dimensional, WGS 84-based, ECEF Cartesian coordinate system that is standard for the exploitation of GPS data. All of the location descriptions for the LS antennas and the collateral information are transformed in accord with this system for the location-determination evaluations.

The GPS-related coordinate transformation discussions referenced herein, e.g., section 1 of Bugayevskiy and Snyder and section 10 of Hofmann-Wellenhof, Lichtenegger, and Collins, describe calculations involved in relating ECEF coordinate values to corresponding values for horizontal (latitude, longitude) location and altitude or height above mean sea level, expressed in terms of local, geodetic coordinates. GPS coordinate transformations are based upon the WGS 84 parametric representation of the earth's shape. Thus the WGS 84 representation of the earth as an ellipsoid of revolution provides the geodetic basis in the expression of the calculated location results. In the operational domain of any local location-determination system, the results are quantified in terms of the WGS 84 geodetic latitude, the longitude, and the height above the WGS 84 ellipsoid and/or the height above the mean sea level of a local geoid surface, which is itself described in terms of height above the WGS 84 ellipsoid surface. As mentioned above, when the MS of interest can be reasonably presumed to be at the local ground level, the height can be constrained to this locally representative surface level above the WGS 84 ellipsoid. In this case, the locations evaluated in the likelihood considerations need only span the latitude and longitude domains relevant to the ensemble of available observations or measurements.

For an alternative coordinate system representation, the ECEF system values for the instantaneous location and velocity parameters of the SVs could be transformed into an "east-north-up (ENU)" coordinate system that is convenient for a local region of applicable LSs. However the use of such a system in an alternative embodiment of the present invention would require the additional coordinate system transformation of the SV coordinates from the ECEF system natural for the use of the GPS ephemerides to the local ENU coordinates tangent and orthogonal to the WGS 84 ellipsoid. Such an alternative implementation may exploit the similarity or proximity of such coordinate system to a local, planar, preferably conformal projection of the earth's surface. For such usage, proper consideration of the instantaneous location and velocity vector relations of the SVs with respect to the appropriate direction of "up" is essential.

Constrained TDOA/FDOA

The psuedo-ranges computed by a GPS/AGPS (even EOTD) receiver may be combined with network-based location measurements, such as TOA, TDOA, AOA, relative power, and round trip delay, to compute a more accurate and robust solution. For example, constrained TDOA/FDOA calculations may be used in a GPS/AGPS environment. The constraints can determined by a combination of data collected by an assisting GPS receiver, which limits the effects of time offset or Doppler caused by the position and velocity of the satellites, along with constraints determined using the position computed by GPS/AGPS, a network-based location method, or a combination. Constrained TDOA/FDOA can reduce the processing burden on the GPS receiver, and improve sensitivity by eliminating most opportunities for false alarm. For further background, see U.S. application Ser. No. 09/908,998, filed Jul. 18, 2001, "Improved Method for Estimating TDOA and FDOA in a Wireless Location System," which is hereby incorporated by reference in its entirety.

Enhanced GSM Synchronization

An enhanced synchronization technique may be employed to increase the system sensitivity to discovering GSM beacons and their respective mapping to GPS time. Using this technique, an Abis monitor (or Abis Monitoring System, or AMS) may be used to provide synchronization information that will partially describe the mapping of the absolute frame number (FN) to GPS time. The parameters provided by the AMS contain the RFN (reduced frame number, T1', T2, T3)—the partial description of GSM frame number. This information may be combined with observations and calculations made directly by LMUs monitoring the downlink path to further converge on the timing solution. For further information about the use of an AMS in a wireless location system, see U.S. application Ser. No. 09/909,221, filed Jul. 18, 2001, "Monitoring of Call Information in a Wireless Location System," which was published on Apr. 4, 2002 as Publication No. US-2002-0039904-A1 and which is hereby incorporated by reference in its entirety.

Hybrid AGPS/TDOA/AOA System for Increasing Capacity/Service Levels

In a multiple-vendor GSM environment, a number of location-based services will exist, each with different accuracy, call states, and latency requirements. Also, location technology should be designed to cope with real-world traffic and loading requirements. A combined TDOA/AGPS system presents an ideal system for confronting the multiple challenges to a wireless location system.

1. For cases when early, enhanced call routing is required, TDOA is best.
2. When a user is on a call, TDOA is best with no additional traffic loading.
3. When the MS is idle or the position is latency insensitive, AGPS is best.
4. When the system is lightly loaded, AGPS is best/most accurate
5. When the system is heavily loaded, TDOA is best.
6. When the system requires high accuracy, TDOA and AGPS an be used in combination.
7. When a legacy phone (non-GPS capable phone) is in operation, TDOA is best.

The ability to switch back and forth between the two approaches (handset-based and network-based) according to location latency requirements, call state and network state provides substantial benefits. In addition, the use of an AMS to determine the call state is important to the success of this combined approach.

Conclusion

The principles, preferred embodiments, and modes of operation of the present invention have been set forth in the foregoing specification, from which it should now be readily apparent that a person of ordinary skill in the art may implement appropriate data processing to effect the described technology. The embodiments disclosed herein should be interpreted as illustrating the present invention and not as restricting it. The foregoing disclosure is not intended to limit the range of equivalent structure available to a person of ordinary skill in the art in any way, but rather to expand the range of equivalent structures in ways not previously envisioned. Numerous variations and changes can be made to the foregoing illustrative embodiments without departing from the scope and spirit of the present invention as set forth in the appended claims.

Accordingly, the true scope the present invention is not limited to the presently preferred embodiments disclosed herein. For example, the foregoing disclosure of a presently preferred embodiment of a wireless location system uses explanatory terms, such as Location Measurement Unit (LMU), Serving Mobile Location Center (SMLC), and the like, which should not be construed so as to limit the scope of protection of the following claims, or to otherwise imply that the inventive aspects of the system are limited to the particular methods and apparatus disclosed. Moreover, as will be understood by those skilled in the art, the inventive aspects disclosed herein may be applied in location systems that are not based on TOA and/or TDOA techniques. For example, the processes by which the wireless location system determines TDOA and/or FDOA values can be applied to non-TDOA systems. Similarly, the invention is not limited to systems employing LMUs and other subsystems constructed as described above. The LMUs, SMLC, etc., are, in essence, programmable data collection and processing devices that could take a variety of forms without departing from the inventive concepts disclosed herein. Given the declining cost of digital signal processing and other processing functions, it is possible, for example, to transfer the processing for a particular function from one of the functional elements described herein to another functional element without changing the inventive operation of the system. In many cases, the place of implementation (i.e., the functional element) described herein is merely a designer's preference and not a hard requirement. Accordingly, except as they may be expressly so limited, the scope of protection of the following claims is not intended to be limited to the specific embodiments described above.

We claim:

1. A system for the determination of the location of a mobile station (MS) equipped with embedded GPS signal reception capability and equipped to operate within a wireless communications network based on the Global System for Mobile communications (GSM), the system comprising position-determination equipment (PDE) including: a plurality of location measurement units (LMUs) each of which is embedded at a networked land station (LS) for signal detection and processing, wherein each LMU is connected to and receives signals from a GPS antenna and from wireless communications band antenna(s); a serving mobile location center (SMLC) at a central collection-and-analysis land station (LS), said SMLC being configured to assemble measurements from the LMUs and to calculate the MS location; and a location gateway (LG) at the central land station configured to receive location requests from a mobile positioning center (MPC) specifying the identity and serving cell assignment data for a MS of interest, said location gateway providing a PDE portal for the reception of location requests and for provision of location-determination results to the MPC;

wherein the system is programmed and configured to perform the following steps:

a request for the location of a particular MS of interest originating at the MPC is received at the LG, and the LG validates the authenticity and authorization for the location request, wherein a valid request identifies the serving cell and associated communications protocol parameters, including assigned frequency, that shall apply for the communications with the MS;

the LG provides the request to the SMLC appropriate for the determination of locations for MSs operating in the vicinity of the serving cell;

the selected SMLC receives and reviews any request to determine the list of cooperating LMUs that are optimal for supporting location requests associated with the identified serving cell;

in anticipation of the need to rapidly support a request for assisting GPS data, the SMLC maintains and evaluates current GPS configuration data that specify the location and motion parameters for the GPS satellite vehicles (SVs), wherein these data are persistently monitored by the LMUs through their GPS receivers, and wherein the LMUs provide to the SMLC the Doppler shifts, pseudoranges, and relevant demodulated navigation message data for the GPS SV telemetry streams received at the LMU positions;

the SMLC receives these GPS SV data periodically communicated from the LMUs, and for each potential serving cell, the SMLC evaluates and derives a current list that specifies the optimal SVs in potential view near the cell site, along with the restricted domains of Doppler shift and pseudorange that are anticipated to be appropriate for assisting in an AGPS reception; and in order to exploit the availability of the up-to-date descriptions of the GPS configuration parameters to support a reduced time to first fix (TTFF) from the MS GPS receiver, the SMLC responds to a particular location request and provides the AGPS parameters appropriate for the vicinity of the serving cell site, wherein these AGPS parameters are received by the LG and are provided to the MPC to be communicated to the MS in a GPS data request.

2. The system as recited in claim 1, wherein the SMLC also proceeds to request the development of data related to the MS location from all LMUs that are optimally configured to cooperate in the determination of locations served by the identified cell site.

3. The system as recited in claim 2, wherein the LMUs apply their signal acquisition and processing facilities to detect and extract the data appropriate for support of the location-determination calculations, and these LMU data are then provided to and received by the SMLC for integration into the location processing.

4. The system as recited in claim 3, wherein, in support of the location determinations, the GPS data relevant to the MS location is sensed by the MS receiver with whatever assistance its processing facilities are configured to exploit, and the MS develops this data and communicates the data to the serving cell site for inclusion in the location calculations, wherein the MS's GPS data is provided to the PDE by way of the wireless communications system (WCS), and wherein the LG receives these data from the WCS or, optionally, the LMUs receive, demodulate, and provide the MS's GPS data from the MS response message.

5. The system as recited in claim 4, wherein the SMLC receives the GPS information that the MS has provided for insertion into the integrated location-determination calculations.

6. The system as recited in claim 5, wherein, with the data received from the LMUs and from the MS, the SMLC integrates all of the data in deriving an optimal probable estimate for the MS location parameters.

7. The system as recited in claim 6, wherein the location-related measurements obtained from the cooperating LMUs include data of various forms and positional sensitivities from LMU positions and equipment that support various individual accuracies, and the GPS data may individually define or support stand-alone data location, with potential correctable biases, or may only provide pseudorange and Doppler measurements for a limited, incomplete set of SV signals due to occlusion or distortion of the GPS signal propagation paths, and wherein the SMLC combines all of the data provided and integrates them into probability-based evaluations that incorporate whatever additional relevant collateral information is available to further condition the location estimate.

* * * * *